No. 761,175. PATENTED MAY 31, 1904.
J. C. MELOON.
DRY PIPE VALVE.
APPLICATION FILED SEPT. 11, 1902.
NO MODEL. 2 SHEETS—SHEET 1.

No. 761,175. PATENTED MAY 31, 1904.
J. C. MELOON.
DRY PIPE VALVE.
APPLICATION FILED SEPT. 11, 1902.
NO MODEL. 2 SHEETS—SHEET 2.

WITNESSES, INVENTOR,
James H. Thurston Jonathan C. Meloon
Catherine G. Bradley BY Wilmarth H. Thurston
ATTY.

No. 761,175. Patented May 31, 1904.

UNITED STATES PATENT OFFICE.

JONATHAN C. MELOON, OF PROVIDENCE, RHODE ISLAND, ASSIGNOR TO GENERAL FIRE EXTINGUISHER COMPANY, OF NEW YORK, N. Y., A CORPORATION OF NEW YORK.

DRY-PIPE VALVE.

SPECIFICATION forming part of Letters Patent No. 761,175, dated May 31, 1904.

Application filed September 11, 1902. Serial No. 122,984. (No model.)

*To all whom it may concern:*

Be it known that I, JONATHAN C. MELOON, of the city and county of Providence and State of Rhode Island, have invented certain new and useful Improvements in Dry-Pipe Valves, (Case B;) and I do hereby declare the following specification, taken in connection with the accompanying drawings, forming a part of the same, to be a full, clear, and exact description thereof.

The invention relates to dry-pipe valves for automatic sprinkler systems; and it consists in a novel combination and arrangement of parts, as hereinafter described.

Figure 1:
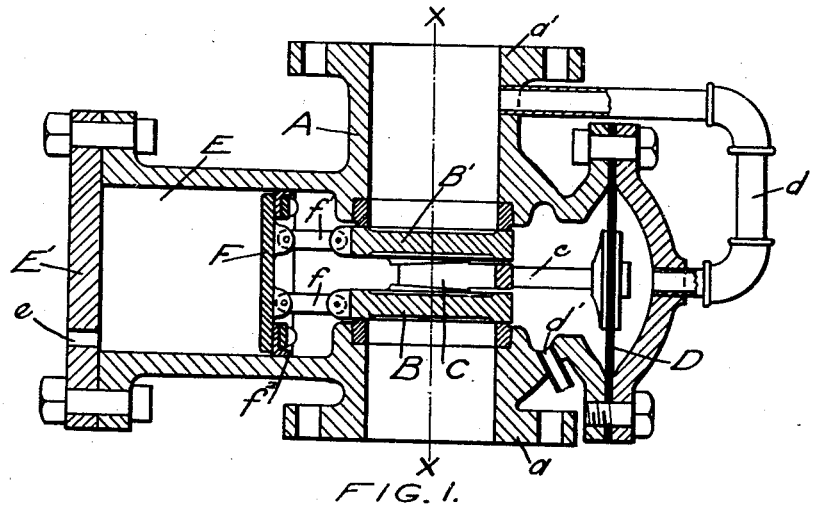
Figure 2:
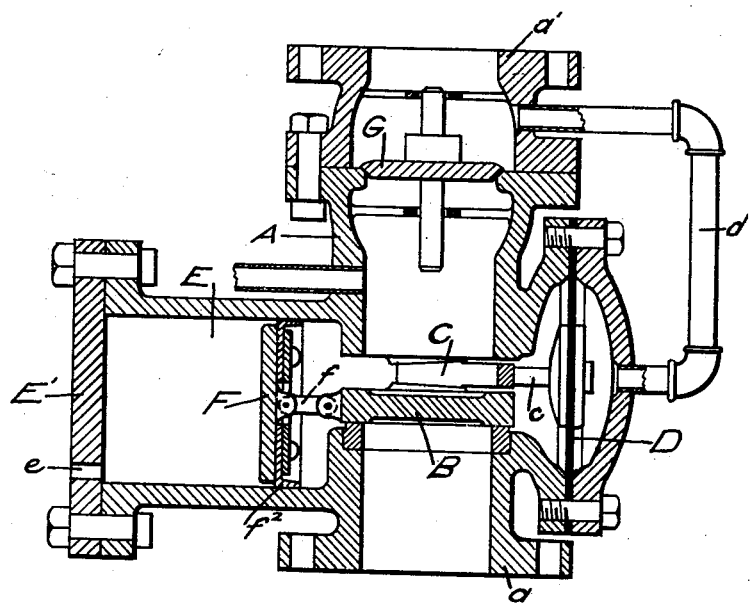
Figure 3:
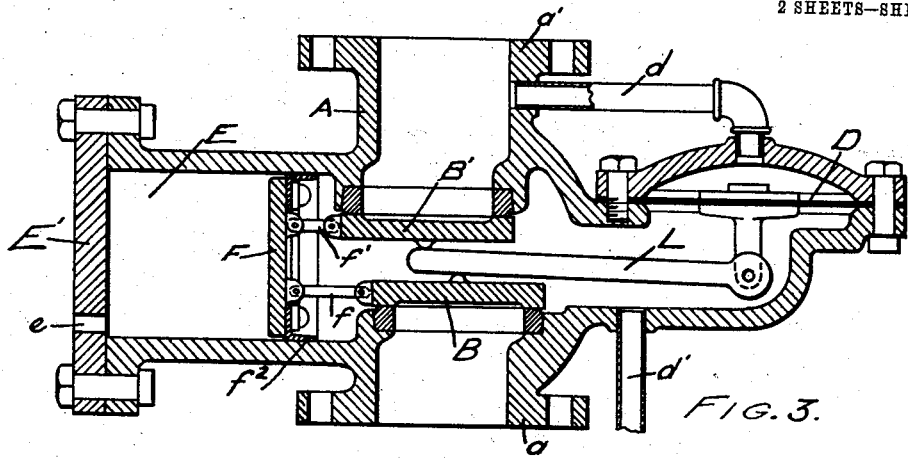
Figure 4:
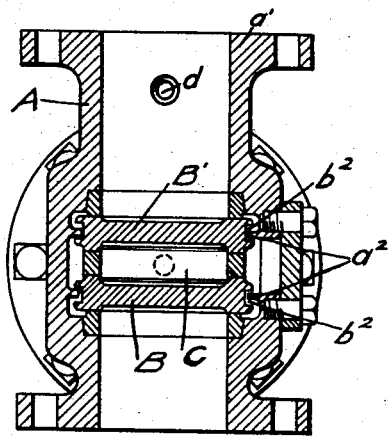
Figure 5:
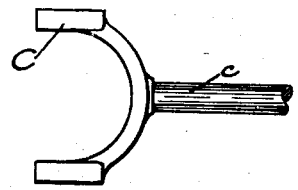

Referring to the drawings, Figure 1 is a vertical section of a dry-pipe valve embodying my invention. Fig. 2 is a similar vertical section showing a modified construction. Fig. 3 is a similar vertical section showing another modification. Fig. 4 is a vertical section on the line $x\,x$ of Fig. 1, and Fig. 5 is a detail.

Referring to Fig. 1, A represents the valve-casing, adapted to be connected at its lower end $a$ with the water-supply pipe and at its upper end $a'$ with a delivery-pipe leading to the sprinkler system. In the construction here shown two separate valves B B' are employed, the valve B serving to close the inlet from the water-pipe and the valve B' serving to close the outlet leading to the delivery-pipe. These two valves are firmly held to their respective seats by means of a wedge C, interposed between them. This wedge is preferably formed in U shape, as shown in Fig. 5, and so as to straddle the waterway. The inclined faces of the wedge coöperate with corresponding inclined faces formed on the valves, as shown in Fig. 1. The wedge C is provided with a stem $c$, the outer end of which is connected to a diaphragm D, located in a suitable chamber formed in the valve-casing. A pipe $d$ connects this chamber with the delivery-passage of the valve-casing and so that the air-pressure in the distributing-pipes will have access to the diaphragm D and act upon said diaphragm in a direction to force the wedge C between the two valves, and thereby hold said valves to their seats. The space between the two valves and the space connecting therewith constitute the immediate chamber, which is normally open to the atmosphere through a drip-pipe $d'$ in the usual manner. The valve-casing A is provided with an extension forming a cylindrical chamber E, the outer end of which is closed by a head or cap E'. In this chamber there is a piston F. This piston is connected to the two valves B B' by suitable connecting-links $f\,f'$, pivoted to the piston and to said valves. A small orifice or outlet $e$ is formed in the head E' to permit the escape of air from the chamber E as the piston F travels back therein. The piston F is provided with a suitable packing $f^2$. For the purpose of guiding the valves B B' as they are withdrawn from the waterway it is preferred to form projections $a^2\,a^2$ on the inside of the valve-casing, said projections being adapted to enter recesses $b^2\,b^2$, formed on opposite edges of each valve, as shown in Fig. 4.

The operation of the apparatus above described is as follows: The air-pressure in the distributing-pipes acting upon the diaphragm D forces the wedge C between the two valves B B', thereby forcing said valves against their respective seats, the valve B excluding the entrance of water from the supply-pipe and the valve B' serving to exclude the air in the system from the intermediate chamber. The parts remain in this position until a sprinkler opens and allows the air-pressure in the distributing-pipes to become reduced below the point at which it will hold the wedge C in position against the water-pressure on the valve B. When this happens, the pressure on the water-valve B will force the wedge outward and so as to release the valves. The release of the valve B will permit the water from the supply-pipe to enter the intermediate chamber, and the water-pressure acting upon the piston F will force said piston to the left, and thus draw or pull the valves B B' to one side and out of the waterway, thereby leaving a free and unobstructed passage for the water through the valve-casing. The water-pressure will also act upon the diaphragm D; but as the movement of said diaphragm is limited the wedge C will not be moved to one side of the waterway, and said wedge, therefore, is made U-shaped, so as to straddle the waterway.

Fig. 2 shows a similar construction and arrangement of parts except that only one valve B is employed to be acted upon by the wedge C, said wedge in this case abutting against the inner end of the delivery portion of the valve-casing, as shown, and an ordinary check-valve G, located in the outlet-passage, is employed to exclude the pressure in the system from the intermediate chamber. The operation is the same as with the arrangement shown in Fig. 1 except that only the water-valve B is withdrawn from the waterway.

In the arrangement shown in Fig. 3 a lever L is employed instead of a wedge to hold the two valves B B' to their seats, said lever being suitably connected to the diaphragm D. Each of the valves is provided with a boss or projection to serve as a fulcrum for the lever L, and in the arrangement shown it will be noted that the lever fulcrums on the valve B' to hold the valve B closed, and vice versa. The lever L performs the same function as the wedge C, and in the claims where the wedge is included as an element it is to be understood that the lever is intended to be included within the scope of said claims as an equivalent for the wedge.

What I claim as my invention, and desire to secure by Letters Patent, is—

1. In a dry-pipe valve, the combination with the valve-casing having an inlet and an outlet, of two valves one adapted to close the inlet, and the other the outlet, of a device interposed between said valves for forcing said valves to their seats, and means for holding said device in position to hold said valves to their seats, substantially as described.

2. In a dry-pipe valve, the combination, with the valve-casing having an inlet and an outlet, of a valve for closing said inlet, a device acting on said valve to hold it closed, and means for holding said device in position by pressure in the system, substantially as described.

3. In a dry-pipe valve, the combination, with the valve-casing having an inlet and an outlet, of a valve for closing said inlet, a U-shaped wedge acting on said valve to hold it closed, and means for holding said wedge in position, substantially as described.

4. In a dry-pipe valve, the combination, with the valve-casing having an inlet and an outlet, of a valve for closing said inlet, a wedge acting on said valve to hold it closed, and a diaphragm acted upon by the pressure in the system for holding said wedge in position, substantially as described.

5. In a dry-pipe valve, the combination, with the valve-casing having an inlet and an outlet, of a valve for closing said inlet, a wedge acting on said valve to hold it closed, means for holding said wedge in position by pressure in the system, and means for withdrawing said valve from the waterway when said valve is released, substantially as described.

6. In a dry-pipe valve, the combination, with the valve-casing having an inlet and an outlet, of a valve for closing said inlet, a wedge acting on said valve to hold it closed, a diaphragm acted upon by the pressure in the system for holding said wedge in position, and means for withdrawing said valve from the waterway when the pressure in the diaphragm is reduced and the valve thereby released, substantially as described.

JONATHAN C. MELOON.

Witnesses:
W. H. THURSTON,
J. H. THURSTON.